US011805796B2

(12) United States Patent
Okuyama et al.

(10) Patent No.: US 11,805,796 B2
(45) Date of Patent: Nov. 7, 2023

(54) CRUCIFEROUS VEGETABLE SEASONING AND METHOD FOR MANUFACTURING SAME, FOOD OR BEVERAGE CONTAINING CRUCIFEROUS VEGETABLE, AND METHOD FOR ENHANCING RICH TASTE OF FOOD OR BEVERAGE CONTAINING CRUCIFEROUS VEGETABLE

(71) Applicant: KAGOME CO., LTD., Nagoya (JP)

(72) Inventors: Kayoko Okuyama, Tokyo (JP); Yuko Kino, Tokyo (JP)

(73) Assignee: Kagome Co., Ltd., Nagoya (JP)

( * ) Notice: Subject to any disclaimer, the term of this patent is extended or adjusted under 35 U.S.C. 154(b) by 312 days.

(21) Appl. No.: 16/611,376

(22) PCT Filed: May 9, 2018

(86) PCT No.: PCT/JP2018/017928
§ 371 (c)(1),
(2) Date: Nov. 6, 2019

(87) PCT Pub. No.: WO2018/207818
PCT Pub. Date: Nov. 15, 2018

(65) Prior Publication Data
US 2020/0154746 A1  May 21, 2020

(30) Foreign Application Priority Data

May 12, 2017 (JP) ................. 2017-095879
May 15, 2017 (JP) ................. 2017-096137

(51) Int. Cl.
| A23L 27/10 | (2016.01) |
| A23L 5/10 | (2016.01) |
| A23L 19/00 | (2016.01) |
| A23L 2/56 | (2006.01) |

(52) U.S. Cl.
CPC ............. *A23L 27/10* (2016.08); *A23L 2/56* (2013.01); *A23L 5/12* (2016.08); *A23L 5/13* (2016.08); *A23L 5/15* (2016.08); *A23L 19/00* (2016.08); *A23V 2002/00* (2013.01)

(58) Field of Classification Search
CPC . A23L 19/00; A23L 2/56; A23L 27/10; A23L 5/12; A23L 5/13; A23L 5/15
See application file for complete search history.

(56) References Cited

U.S. PATENT DOCUMENTS

| 6,254,912 B1 * | 7/2001 | Takeuchi ............... A23B 4/033 426/639 |
| 6,544,570 B1 | 4/2003 | Sato et al. |
| 2006/0141100 A1 * | 6/2006 | Dimitrov .................. A21D 2/36 426/94 |
| 2009/0214728 A1 * | 8/2009 | Ley .......................... A23L 27/45 426/295 |
| 2016/0376263 A1 * | 12/2016 | Patron .................. C07D 413/14 514/784 |

FOREIGN PATENT DOCUMENTS

| JP | S57174068 A | 10/1982 |
| JP | S6070046 A | 4/1985 |
| JP | S6244144 A | 2/1987 |
| JP | H08112073 A | 5/1996 |
| JP | 10-042841 A | 2/1998 |
| JP | 10-313834 A | 12/1998 |
| JP | H11127775 A | 5/1999 |
| JP | 2001-204405 A | 7/2001 |
| JP | 2005015684 A | 1/2005 |
| JP | 3676178 B | 7/2005 |
| JP | 2007068457 A | 3/2007 |
| JP | 2007306904 A | 11/2007 |
| JP | 2011-050349 A | 3/2011 |
| JP | 2012085607 A | 5/2012 |
| JP | 2014030381 A | 2/2014 |
| JP | 2014055201 A | 3/2014 |
| JP | 2016131518 A | 7/2016 |
| JP | 2016152819 A | 8/2016 |

OTHER PUBLICATIONS

Damn Delicious, Garlic Parmesan Roasted Broccoli, available at: https://damndelicious.net/2014/09/19/garlic-parmesanroasted-broccoli/print/; accessed on Feb. 24, 2022; published on Sep. 19, 2014. (Year: 2014).*

Café Fernando, How to make a flavorful vegetable broth, available at: http://cafefernando.com/how-to-make-a-flavorfulvegetable-broth/; accessed on Feb. 25, 2022; published on Jan. 21, 2009 (Year: 2009).*

Leite's Culinaria, Vegetable Broth Recipe, available at: https://leitesculinaria.com/97417/recipes-vegetable-broth.html, accessed on Feb. 5, 2022; published Nov. 23, 2014. (Year: 2014).*

Anonymous, "Squeezing as much liquid as possible out of a stock: a practical approach?", available at: https://cooking.stackexchange.com/questions/79727/squeezing-as-much-liquid-as-possible-out-of-a-stock-apractical-approach; published Apr. 13, 2017; accessed on Jul. 19, 2022. (Year: 2017).*

Weil, Vegetable stock, available at: https://web.archive.org/web/20161021142321/https://www.drweil.com/diet-nutrition/recipes/vegetable-stock/; accessed on Jul. 19, 2020; published on Oct. 21, 2016. (Year: 2016).*

(Continued)

*Primary Examiner* — Jeffrey P Mornhinweg
(74) *Attorney, Agent, or Firm* — Wolf, Greenfield & Sacks, P.C.

(57) ABSTRACT

A method for producing a cruciferous vegetable seasoning, the method including:

at least an odor-reducing heat treatment and an odor-imparting heat treatment, wherein:

the odor-reducing heat treatment includes heating a cruciferous vegetable so as to reduce an odor thereof;

the odor-imparting heat treatment includes subjecting a liquid of the cruciferous vegetable to odor-imparting heating, thereby imparting a heated odor thereto; and the odor-imparting heat treatment is performed after the odor-reducing heat treatment.

9 Claims, 2 Drawing Sheets

(56) References Cited

OTHER PUBLICATIONS

Woman's Day Kitchen, Roasted Broccoli Soup, available at: https://www.womansday.com/food-recipes/food-drinks/recipes/a13421/roasted-broccoli-soup-recipe-wdy0315/; accessed on Jan. 20, 2023; published on Feb. 13, 2015. (Year: 2015).*
International Search Report dated Jul. 31, 2018 in connection with PCT/JP2018/017928.
Japanese Office Action for Application No. 2017-095879 dated Apr. 27, 2021.
Japanese Office Action for Application No. 2017-096137 dated Apr. 27, 2021.
Japanese Office Action for Application No. 2017-095879 dated Nov. 16, 2021.
Chinese Office Action for Application No. 201880030678.0 dated Apr. 1, 2022.
[No Author Listed] Introducing Idea Recipes Using "Rich Vegetables" and "One Day's Worth of Vegetables" in a package, ITO EN News Release, Sep. 30, 2010. Retrieved from https://www.itoen.co.jp/news/detail/id=20994, [Search date Nov. 9, 2021].
[No Author Listed] ITO En: Easy Healthy Recipe Contest Using Vegetable Drinks, Recipe Blog-Full of Recipes for Cooking Blog!, Jul. 14, 2014. Retrieved from https://www.recipe-blog.jp/sp/r140507a, [Search date Nov. 9, 2021].
[No Author Listed] Squid Basil Saute [Adding Flavor with Vegetable Juice], Simple Recipe to Enjoy at Home. May 26, 2014. Retrieved from alldayrecipe.blog.fc2.com/blog-entry-847.html, [Search date Nov. 9, 2021 Day].
Fernandes et al., Volatile constituents throughout *Brassica oleracea* L. Var. acephala germination. J Agric Food Chem. Aug. 12, 2009;57(15):6795-802. doi: 10.1021/jf901532m. PMID: 19606906.
Hansen et al., Broccoli Storage under low-oxygen atmosphere: identification of higher boiling volatiles. J Agric Food Chem. 1992;40:850-852.
Rajkumar et al., Comparative evaluation of physical properties and volatiles profile of cabbages subjected to hot air and freeze drying. LWT. Jul. 2017;80:501-509.
Valette et al., Volatile constituents from Romanesco cauliflower. Food Chemistry. Mar. 2003; 80(3):353-358.

\* cited by examiner

CRUCIFEROUS VEGETABLE SEASONING AND METHOD FOR MANUFACTURING SAME, FOOD OR BEVERAGE CONTAINING CRUCIFEROUS VEGETABLE, AND METHOD FOR ENHANCING RICH TASTE OF FOOD OR BEVERAGE CONTAINING CRUCIFEROUS VEGETABLE

CROSS REFERENCE TO RELATED APPLICATIONS

This Application is a National Stage filing under 35 U.S.C. 371 of International Patent Application No. PCT/JP2018/017928, filed May 9, 2018, which claims priority to Japan Application Number 2017-096137, filed May 15, 2017, and Japan Application Number 2017-095879, filed May 12, 2017. The entire contents of these applications are incorporated herein by reference in their entirety.

TECHNICAL FIELD

The present invention relates to a cruciferous vegetable seasoning and a method for producing the same, and a food or drink containing a cruciferous vegetable (cruciferous vegetable-containing food or drink), and a method for enhancing richness in a cruciferous vegetable-containing food or drink.

BACKGROUND ART

In recent years, "koku" (richness) in food and drink has been attracting attention as an important factor that determines the palatability. "Koku" is a sensory characteristic that involves complexity, persistence, and the like in the mouth due to the contribution of taste, smell and texture. Water-soluble components, fat-soluble components and the like have hitherto been known as components that contribute to "koku".

As "koku" affects the palatability of food and drink, "koku" is regarded as an important factor determining the taste in the fields of food and drink, especially seasonings.

Amino acids are important components in seasonings. From such a point of view, animal raw materials are used in seasonings, and examples thereof include meat, fish and the like. On the other hand, the non-use of animal raw materials is required in the market. In response to such demands, protein rich plant raw materials will be used instead of animal raw materials, and examples thereof include beans.

Under such circumstances, the inventors of the present invention have conceived a cruciferous vegetable seasoning by paying attention to the richness of cruciferous vegetables. A cruciferous vegetable seasoning refers to a seasoning in which a part or all of the raw materials thereof is a cruciferous vegetable. Soffritto is already well known in this context. In recent years, seasonings derived from vegetables such as soffritto have also been known and used for food and drink in some cases. Soffritto refers to those obtained by frying pot herbs (onions, garlic and the like). One of the disadvantages of pot herbs is their weak richness. One means for solving this disadvantage is the use of cruciferous vegetables. This is because the amino acid content of cruciferous vegetables is higher than that of other vegetables.

On the other hand, cruciferous vegetables have a peculiar odor (grassy smell). This grassy smell is avoided. When using a cruciferous vegetable as a raw material for food and drink, various methods for reducing this grassy smell have been studied. Patent Document 1 describes a method of processing a cruciferous vegetable, more specifically, a method of processing a cruciferous vegetable in which a squeezed liquid is subjected to anion exchange by steaming under specific conditions before shredding in order to reduce a peculiar odor. Patent Document 2 describes a method for producing a squeezed liquid of a cruciferous vegetable, more specifically, a method for producing a squeezed liquid in which an odor component of a cruciferous vegetable is adsorbed (a squeezed liquid of a cruciferous vegetable is subjected to a contact treatment using a porous synthetic adsorption resin), in order to reduce an odor of a cruciferous vegetable.

CITATION LIST

Patent Documents

[Patent Document 1] Japanese Patent No. 3676178
[Patent Document 2] Japanese Unexamined Patent Application, First Publication No. Hei 10-313834

SUMMARY OF INVENTION

Technical Problem

The problem to be solved by the present invention is the enhancement of richness in cruciferous vegetable seasonings. More specifically, it is the enhancement of richness and the suppression of grassy smell in cruciferous vegetable seasonings. As mentioned above, a trade-off relationship between the "koku (richness)" and the "grassy smell" is inherent in cruciferous vegetables. In other words, although the richness is strong, the grassy smell also strong. It is required to further enhance the richness while suppressing the grassy smell in the method for producing a cruciferous vegetable seasoning.

In another aspect, the problem to be solved by the present invention is the enhancement of richness in the cruciferous vegetable-containing food or drink, and more specifically, the suppression of the grassy smell derived from cruciferous vegetables, and the enhancement of richness.

Solution to Problem

The inventors of the present application examined how to increase the components contributing to the richness of the cruciferous vegetable seasoning and remove the grassy smell components. As a result, the inventors of the present application have discovered that: (1) an odor contributing to the richness increases by heating; (2) the richness becomes difficult to perceive when the grassy smell is strong; (3) the components contributing to the grassy smell is highly volatile and the contents thereof tend to decrease by a process involving vaporization; and (4) an enzyme capable of generating the components contributing to the grassy smell can be inactivated by heating. The present invention can be defined as follows by applying the above mechanism.

The method for producing a cruciferous vegetable seasoning according to the present invention is constituted of at least an odor-reducing heating process and an odor-imparting heating process. The odor-imparting heating process is performed after the odor-reducing heating process.

That is, one aspect of the method for producing a cruciferous vegetable seasoning according to the present invention is a production method including, at least an odor-reducing heat treatment and an odor-imparting heat treatment, and the aforementioned odor-imparting heat treatment is performed after the aforementioned odor-reducing heat treatment.

In the present specification, the term "cruciferous vegetable seasoning" means a seasoning in which a part or all of the raw materials thereof is a cruciferous vegetable (hereinafter the same applies in this section). The term "raw material" as used herein refers to a material serving as a base for producing a cruciferous vegetable seasoning.

Further, in the present specification, the term "odor-reducing heating" refers to a heating process performed in order to reduce an odor (hereinafter the same applies in this section). Examples of the odor-reducing heat treatment include boiling (hereinafter sometimes referred to as blanching), and the like.

Further, in the present specification, the term "odor-imparting heating" refers to a heating process performed in order to add an odor (hereinafter the same applies in this section). Examples of the odor-imparting heat treatment include heating concentration and the like.

Moreover, an endogenous enzyme of a cruciferous vegetable is inactivated by subjecting the cruciferous vegetable to the odor-reducing heat treatment.

A liquid of a cruciferous vegetable is imparted with a heated odor by being subjected to the odor-imparting heat treatment. In the present specification, the expression "liquid of a cruciferous vegetable" means a liquid derived from a cruciferous vegetable which has been subjected to an odor-reducing heat treatment (for example, a squeezed liquid, a liquid obtained by solid-liquid separation, or the like).

In the present specification, the expression "heated odor is imparted" means that the content of a specific component, for example, phenylacetaldehyde, is increased (generated) by heating, as compared to that before heating.

As defined in still another aspect, the method for producing a cruciferous vegetable seasoning according to the present invention is constituted of at least an odor-reducing heating process and an odor-imparting heating process. The odor-imparting heating process is performed simultaneously with the odor-reducing heating process.

That is, another aspect of the method for producing a cruciferous vegetable seasoning according to the present invention is a production method including, at least an odor-reducing heat treatment and an odor-imparting heat treatment, and the aforementioned odor-imparting heat treatment is performed simultaneously with the aforementioned odor-reducing heat treatment.

By subjecting a cruciferous vegetable to the odor-reducing heat treatment, an odor component contained in the cruciferous vegetable is vaporized. At the same time, by subjecting the cruciferous vegetable to the odor-imparting heat treatment, a heated odor is imparted. Examples of these heat treatments include baking and frying.

It is a fractionation process that further constitutes this production method. That is, the aforementioned production method may further include fractionating a component containing an umami component and an odor component and derived from a cruciferous vegetable which has been subjected to an odor-imparting heat treatment (for example, baking or frying).

The fractionation can be performed, for example, by solvent extraction or squeezing.

Moreover, the inventors of the present invention discovered, as a result of trial and error in producing a cruciferous vegetable-containing food or drink, that an odor component affects the richness. That is, the inventors of the present invention found that the richness can be enhanced by increasing the content of a specific odor component, and more preferably, the richness can be enhanced by lowering the content of another specific odor component which is different from the aforementioned specific odor component.

More specifically, the inventors of the present invention found that: the richness is enhanced when the ratio of the content (ppb) of the component (A) (phenylacetaldehyde) to that of the component (B) (2-hexenal), the component (C) (1-octen-3-one), the component (D) (dimethyl trisulfide) or the component (E) (butyl isothiocyanate) is within a specific range; and in another aspect, the richness is enhanced when the contents (ppb) of the components (A) to (E) with respect to the total mass of the cruciferous vegetable-containing food or drink at a specific Brix degree are within specific ranges, respectively. In other words, when a large amount of the component (A) is contained, it becomes easy to feel the richness, and when a large amount of the components (B) to (E) related to the grassy smell is contained, the richness is suppressed.

It should be noted that the aforementioned food or drink may be any of a squeeze liquid, an extract (that is, an extracted product), or a powder.

The present invention includes the following aspects.

[1] A method for producing a cruciferous vegetable seasoning, the method including: at least an odor-reducing heat treatment and an odor-imparting heat treatment, wherein the aforementioned odor-reducing heat treatment includes heating a cruciferous vegetable so as to reduce an odor thereof;

the aforementioned odor-imparting heat treatment comprises subjecting a liquid of the aforementioned cruciferous vegetable to odor-imparting heating, thereby imparting a heated odor thereto; and the aforementioned odor-imparting heat treatment is performed after the aforementioned odor-reducing heat treatment.

[2] The method according to [1], wherein the aforementioned odor-reducing heat treatment further includes inactivating an endogenous enzyme of the aforementioned cruciferous vegetable by subjecting the aforementioned cruciferous vegetable to odor-reducing heating.

[3] The method according to [1] or [2], wherein the aforementioned odor-reducing heat treatment is boiling.

[4] The method according to any one of [1] to [3], wherein the aforementioned odor-imparting heat treatment is heating concentration.

[5] A method for producing a cruciferous vegetable seasoning, the method including: at least an odor-reducing heat treatment and an odor-imparting heat treatment, wherein the aforementioned odor-reducing heat treatment includes heating a cruciferous vegetable so as to reduce an odor thereof;

the aforementioned odor-imparting heat treatment includes subjecting the aforementioned cruciferous vegetable to odor-imparting heating, thereby imparting a heated odor thereto; and the aforementioned odor-reducing heat treatment and the aforementioned odor-imparting heat treatment are performed simultaneously.

[6] The method according to [5], wherein the aforementioned odor-reducing heat treatment includes subjecting the aforementioned cruciferous vegetable to odor-reducing heating, thereby vaporizing an odor component contained in the aforementioned cruciferous vegetable.

[7] The method according to [5] or [6], wherein the aforementioned odor-reducing heat treatment and the aforementioned odor-imparting heat treatment are both baking or frying.

[8] The method according to any one of [1] to [7], further including fractionating a component containing at least an umami component and an odor component from the aforementioned cruciferous vegetable which has been subjected to the aforementioned odor-reducing heat treatment and the aforementioned odor-imparting heat treatment.

[9] A cruciferous vegetable-containing food or drink, including:

at least phenylacetaldehyde (component (A)); and if desired, at least one component selected from the group consisting of 2-hexenal (component (B)), 1-octen-3-one (component (C)) and dimethyl trisulfide (component (D), wherein content ratios of the component (A) to the components (B) to (D) are:

$$0 \leq (B)/(A) \leq 0.00539;$$

$$0 \leq (C)/(A) \leq 0.0435; \text{ and}$$

$$0 \leq (D)/(A) \leq 0.290.$$

[10] A cruciferous vegetable-containing food or drink, including:

phenylacetaldehyde (component (A)); 2-hexenal (component (B)); 1-octen-3-one (component (C)); and dimethyl trisulfide (component (D)), wherein content ratios of the component (A) to the components (B) to (D) are:

$$0.00187 \leq (B)/(A) \leq 0.00539;$$

$$0.0129 \leq (C)/(A) \leq 0.0435; \text{ and}$$

$$0.0607 \leq (D)/(A) \leq 0.290.$$

[11] The cruciferous vegetable-containing food or drink according to [9] or [10], wherein when a Brix degree of the aforementioned cruciferous vegetable-containing food or drink is converted to 5.0, a content (ppb) of the component (A) with respect to a total mass of the aforementioned cruciferous vegetable-containing food or drink is 89.0 or more.

[12] The cruciferous vegetable-containing food or drink according to [9] or [10], wherein when a Brix degree of the aforementioned cruciferous vegetable-containing food or drink is further converted to 5.0, contents (ppb), with respect to a total mass of the aforementioned cruciferous vegetable-containing food or drink, of the component (A), the component (B), the component (C) and the component (D) are: 89.0 or more and 107.0 or less, 0.20 or more and 0.48 or less, 1.38 or more and 3.87 or less, and 6.50 or more and 25.83 or less, respectively.

[13] The cruciferous vegetable-containing food or drink according to any one of [9] to [12], further including, if desired, butyl isothiocyanate (component (E)), wherein a content ratio of the component (A) to the component (E) is $0 \leq (E)/(A) \leq 0.00045$.

[14] The cruciferous vegetable-containing food or drink according to [13], wherein when a Brix degree of the aforementioned cruciferous vegetable-containing food or drink is converted to 5.0, a content (ppb) of butyl isothiocyanate (component (E)) with respect to a total mass of the aforementioned cruciferous vegetable-containing food or drink is 0 or more and 0.04 or less.

[15] A cruciferous vegetable-containing food or drink, wherein the aforementioned cruciferous vegetable-containing food or drink includes phenylacetaldehyde (component (A)), 2-hexenal (component (B)), 1-octen-3-one (component (C)), and dimethyl trisulfide (component (D));

when a Brix degree of the aforementioned cruciferous vegetable-containing food or drink is converted to 5.0, contents (ppb), with respect to a total mass of the aforementioned cruciferous vegetable-containing food or drink, of the component (A), the component (B), the component (C) and the component (D) are as follows:

component (A): 89.0 or more and 107.0 or less;
component (B): 0.20 or more and 0.48 or less;
component (C): 1.38 or more and 3.87 or less; and
component (D): 6.50 or more and 25.83 or less.

[16] The cruciferous vegetable-containing food or drink according to [15], further including, if desired, butyl isothiocyanate (component (E)), wherein when a Brix degree of the aforementioned cruciferous vegetable-containing food or drink is converted to 5.0, a content (ppb) of butyl isothiocyanate (component (E)) with respect to a total mass of the aforementioned cruciferous vegetable-containing food or drink is 0 or more and 0.04 or less.

[17] The cruciferous vegetable-containing food or drink according to any one of [9] to [16], wherein the aforementioned food or drink is any of a squeezed liquid, an extract (extracted liquid), or a powder.

[18] The cruciferous vegetable-containing food or drink according to any one of [9] to [17], wherein a raw material of the aforementioned food or drink is at least broccoli, an onion, celery and a carrot.

[19] A method for enhancing richness of a cruciferous vegetable-containing food or drink, the method including:

adjusting contents of phenylacetaldehyde (component (A)), 2-hexenal (component (B)), 1-octen-3-one (component (C)), and dimethyl trisulfide (component (D)) in the aforementioned cruciferous vegetable-containing food or drink so as to satisfy the following relations:

$$0 \leq (B)/(A) \leq 0.00539;$$

$$0 \leq (C)/(A) \leq 0.0435; \text{ and}$$

$$0 \leq (D)/(A) \leq 0.290.$$

[20] A method for enhancing richness of a cruciferous vegetable-containing food or drink, the method including:

adjusting contents of phenylacetaldehyde (component (A)), 2-hexenal (component (B)), 1-octen-3-one (component (C)), and dimethyl trisulfide (component (D)) in the aforementioned cruciferous vegetable-containing food or drink so as to satisfy the following relations:

$$0.00187 \leq (B)/(A) \leq 0.00539;$$

$$0.0129 \leq (C)/(A) \leq 0.0435; \text{ and}$$

$$0.0607 \leq (D)/(A) \leq 0.290.$$

[21] The method according to [19] or [20], further including adjusting a content (ppb) of the component (A) with respect to a total mass of the aforementioned cruciferous vegetable-containing food or drink to 89.0 or more, when a Brix degree of the aforementioned cruciferous vegetable-containing food or drink is converted to 5.0.

[22] The method according to [19] or [20], further including adjusting contents (ppb) of the components (A) to (D) to values within the following ranges respectively, with respect to a total mass of the aforementioned cruciferous vegetable-containing food or drink, when a Brix degree of the aforementioned cruciferous vegetable-containing food or drink is converted to 5.0:

component (A): 89.0 or more and 107.0 or less;
component (B): 0.20 or more and 0.48 or less;
component (C): 1.38 or more and 3.87 or less; and
component (D): 6.50 or more and 25.83 or less.

[23] The method according to any one of [19] to [22], further including adjusting a content ratio of the component (A) to butyl isothiocyanate (component (E)) so that $0 \leq (E)/(A) \leq 0.00045$.

[24] The method according to [23], further including adjusting a content (ppb) of the component (E) with respect to a total mass of the aforementioned cruciferous vegetable-containing food or drink to 0 or more and 0.04 or less, when a Brix degree of the aforementioned cruciferous vegetable-containing food or drink is converted to 5.0.

[25] A method for enhancing richness of a cruciferous vegetable-containing food or drink, the method including:

adjusting contents (ppb) of phenylacetaldehyde (component (A)), 2-hexenal (component (B)), 1-octen-3-one (component (C)), and dimethyl trisulfide (component (D)) as follows, in the aforementioned cruciferous vegetable-containing food or drink, when a Brix degree of the aforementioned cruciferous vegetable-containing food or drink is converted to 5.0:

component (A): 89.0 or more and 107.0 or less;
component (B): 0.20 or more and 0.48 or less;
component (C): 1.38 or more and 3.87 or less; and
component (D): 6.50 or more and 25.83 or less.

[26] The method according to [25], further including adjusting a content (ppb) of the component (E) with respect to a total mass of the aforementioned cruciferous vegetable-containing food or drink to 0 or more and 0.04 or less, when a Brix degree of the aforementioned cruciferous vegetable-containing food or drink is converted to 5.0.

[27] The method according to any one of [19] to [26], wherein the aforementioned food or drink is any of a squeezed liquid, an extract (extracted liquid), or a powder.

[28] The method according to any one of [19] to [27], wherein a raw material of the aforementioned food or drink is at least broccoli, an onion, celery and a carrot.

Advantageous Effects of Invention

According to the present invention, it is possible to provide a cruciferous vegetable seasoning in which the richness is enhanced.

Further, according to the present invention, it is possible to provide a cruciferous vegetable-containing food or drink in which the richness is enhanced, and a method for enhancing richness in a cruciferous vegetable-containing food or drink.

DESCRIPTION OF EMBODIMENTS

Figure 1:
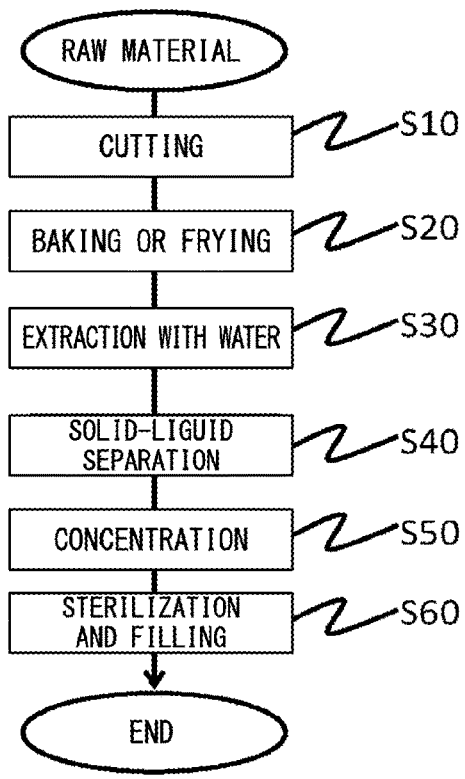
FIG. 1 is a flow chart of a method for producing a cruciferous vegetable seasoning according to an embodiment 1-1.

[First Aspect]
<Cruciferous Vegetable Seasoning>

A cruciferous vegetable seasoning (hereinafter may be referred to as "present vegetable seasoning") according to an embodiment of the present invention means a seasoning in which all or a part of the raw material is a cruciferous vegetable. Here, the term "seasoning" means a material for seasoning purposes. Raw materials other than the cruciferous vegetables are preferably vegetables described later.

<Types and Properties of Present Vegetable Seasoning>

The type of the present vegetable seasoning is not particularly limited, and, for example, soup stock-based seasonings, sauce-based seasonings, sugar-based seasonings, salt-based seasonings, vinegar-based seasonings, soy sauce-based seasonings, miso-based seasonings, sake-based seasonings, oil-based seasonings, spice-based seasonings, and the like can be mentioned. The names of soup stocks vary widely, and examples thereof include dashi (broth), soup stock, bouillon, fond de veau, and tan. Further, the properties of the present vegetable seasoning are not particularly limited, and examples thereof include liquid forms (including extracts, squeezed liquids, and their concentrates or the like), paste forms, solid forms and powder forms.

<Cruciferous Vegetable>

The term "cruciferous vegetable" means a vegetable scientifically classified as belonging to the family Cruciferae. Examples of cruciferous vegetables include cabbage, broccoli, kale, watercress, komatsuna (Japanese mustard spinach), bok choy, white radish sprouts, cauliflower, Chinese cabbage, *Brassica* flower, leaf mustard and kohlrabi. In the present vegetable seasoning, all or part of a portion (flower, leaf, stem or the like) of a cruciferous vegetable can be used as a raw material. In the present vegetable seasoning, one or more of these cruciferous vegetables can be used as a raw material, and it is preferable to use broccoli or cabbage as a raw material.

<Vegetables Other than Cruciferous Vegetables>

The present vegetable seasoning may also use a vegetable other than the cruciferous vegetables as a raw material. The types of the above other vegetables are not particularly limited, and examples thereof include carrot, onion, turnip, Japanese radish, celery, spinach, bell pepper, asparagus, young barley leaf, garland chrysanthemum, Chinese mustard, butterhead lettuce, komatsuna, *Angelica keiskei*, sweet potato, potato, tomato, mulukhiya, paprika, parsley, celery, Japanese honeywort, lettuce, radish, *Perilla frutescens* var. crispa, eggplant, kidney bean, pumpkin, burdock, Welsh onion, ginger, garlic, Chinese chives, corn, snap peas, okra, turnip, cucumber, cucurbitaceous plants, zucchini, sponge gourd and sprout. As vegetables other than the cruciferous vegetables, carrot, onion, celery and the like are preferable since the overall taste balance is improved.

<Method for Producing Present Vegetable Seasoning>

A method for producing the present vegetable seasoning (hereinafter may also be referred to as the "present production method") includes at least performing an odor-reducing heat treatment and an odor-imparting heat treatment. The odor-reducing heating means heating in order to reduce an odor, and examples of the odor-reducing heat treatment includes blanching (boiling), baking, and frying. More specifically, the grassy smell is reduced by the odor-reducing heat treatment. The odor-imparting heating means heating in order to add an odor, and examples of the odor-imparting heat treatment include heating concentration, baking, and frying. More specifically, a heated odor is imparted by the odor-imparting heat treatment. The timing of implementation of the aforementioned odor-imparting heat treatment is at the same time as or after the odor-reducing heat treatment.

The temperature of the odor-reducing heat treatment is preferably from 45° C. to 200° C.

The temperature of the odor-imparting heat treatment is preferably from 45° C. to 200° C.

Further, in another aspect, when the odor-reducing heat treatment and the odor-imparting heat treatment are performed at the same time, the heating temperature is preferably from 45° C. to 200° C., and more preferably from 75° C. to 180° C. The heating time is preferably from 10 to 120 minutes, and more preferably from 15 to 90 minutes.

In yet another aspect, when the odor-imparting heat treatment is performed after the odor-reducing heat treatment, the temperature of the odor-reducing heat treatment is preferably from 50° C. to 200° C., and more preferably from 50° C. to 100° C. The heating time is preferably from 10 minutes to 3 hours, and the temperature of the odor-imparting heat treatment is preferably from 45 to 200° C.

It should be noted that in the present specification, the term "roasting" means baking or frying. "Baking" is a type of cooking technique, and means cooking without regard to the use of a heating medium.

"Frying" is a type of cooking technique and means cooking using a heating medium. An oil may be used for frying. Further, it is preferable to heat the raw material while stirring, during the frying process.

"Boiling" means heating and cooking with hot water.

The present production method may further include fractionation of components containing an umami component and a flavor component (for example, solvent extraction and juice extraction). These components are components derived from the cruciferous vegetables which has been subjected to the odor-imparting heat treatment.

Examples of the umami component include amino acids and nucleic acids.

Examples of the odor component include volatile components such as phenylacetaldehyde, 2-hexenal, 1-octen-3-one, dimethyl trisulfide and butyl isothiocyanate.

Examples of the present production method include the following embodiments 1-1 to 1-3.

<Embodiment 1-1>

FIG. 1 is a diagram showing the flow of a production method according to the embodiment 1-1. The production method of the embodiment 1-1 includes cutting (S10), baking or frying (S20), extraction with water (S30), solid-liquid separation (S40), concentration (S50), and sterilization and filling (S60). In the present embodiment, the odor-reducing heat treatment and the odor-imparting heat treatment are simultaneously performed at least by baking or frying (S20). Further, fractionation is performed at least by the extraction with water (S30). The above-described embodiment 1-1 is characterized in that a seasoning having a property of relatively low viscosity can be produced and can be easily applied to various food and drink.

<Cutting (S10)>

The purpose of cutting cruciferous vegetables and other vegetables (hereinafter may be simply referred to as "vegetables" in some cases) is to shorten the heating time. Another purpose is to shorten the extraction time. Portions of the vegetables (for example, flower parts, insect-fed leaves and the like) may be discarded. The size of the cut vegetables is arbitrary, but it is preferable that the maximum length is about 5 mm to 5 cm.

<Baking or Frying (S20)>

The purpose of baking or frying the cut vegetables is to control the grassy smell. In other words, by baking or frying cruciferous vegetables, the grassy smell component of the cruciferous vegetables (that is, the odor component contributing to the grassy smell) is vaporized. Another purpose is to enhance the richness. That is, by baking or frying a vegetable, a heated odor is generated, and a sense of persistence of flavor is felt due to the heated odor. The heated odor is a smell that makes people feel the richness. In particular, the inventors of the present invention have found that phenylacetaldehyde is a component that increases upon heating (in other words, a component that contributes to the heated odor) and contributes to the richness.

It is presumed that phenylacetaldehyde is a component generated by heating and breaking down phenylalanine, which is a kind of amino acid. The component contributing to the grassy smell has a boiling point lower than that of the component contributing to the heated odor, and is relatively volatile. If baking or frying is insufficient, the grassy smell is not suppressed. When baking or frying is excessive, the scorched smell becomes strong. A strong scorched smell is avoided. From such a point of view, the temperature for baking or frying the vegetables is from 45° C. to 200° C., and preferably from 75° C. to 180° C. Further, the baking or frying time is preferably from 10 to 120 minutes. The baking or frying may be performed by a known method, and can be performed using, for example, a kneader, a roasting kiln or the like. The heat source is not limited to fire, and DI or the like may be employed.

The expression "baking or frying temperature" as used herein means the temperature of the heat source or the heating medium.

<Extraction with Water (S30)>

The purpose of extraction with water is to extract (fractionate) the components contained in the baked or fried vegetables (that is, the components derived from the vegetables which have been subjected to the odor-reducing heat treatment and the odor-imparting heat treatment). By immersing the baked or fried vegetables in water, the components contained in the baked or fried vegetables are eluted. The destination into which the aforementioned components are eluted is water (solvent). If the temperature of water (solvent) is too low, the extraction time increases. On the other hand, when the temperature of water (solvent) is too high, the component derived from vegetables deteriorates. From such a point of view, the temperature of water (solvent) is preferably from 85 to 98° C. The extraction time with water is preferably from 10 minutes to 2 hours.

The amount of water (solvent) used for infusion in water is, for example, preferably 1 to 10 times the total mass of baked or fried vegetables.

<Solid-Liquid Separation (S40)>

The purpose of solid-liquid separation is to suppress the grassy smell. It is the solid portion of vegetables that the grassy smell of vegetables remains in large amounts. By removing the above solid portion, the grassy smell is reduced. Another purpose is to streamline the post process. By removing the solids, the degree of concentration increases when performing the concentration process in the subsequent step. In addition, by removing the solid portion, the viscosity of the liquid is reduced, and application to various foods and drinks becomes easy. The process of solid-liquid separation may be performed by a known method, and examples thereof include a sieving method, a centrifugal separation method and the like. The principle of centrifugal separation may be either a continuous method or a batch method, and examples of the centrifugal separator include a decanter. The necessity of implementation of the present step can be determined in consideration of the final use of the material.

<Concentration (S50)>

The purpose of concentrating the liquid portion (liquid) obtained by solid-liquid separation is to improve the handling of the material. By concentrating the liquid, the volume of the liquid is reduced. In other words, the storage cost of the liquid is reduced. The concentration process can be performed by a known method, and examples thereof include vacuum concentration, membrane concentration and freeze concentration. However, as the above-mentioned concentration method, the heating concentration process as the odor-imparting heat treatment described later is excluded. The liquid portion (liquid) obtained by solid-liquid separation is preferably concentrated, for example, by 2- to 20-fold.

<Sterilization and Filling (S60)>

In addition to the above processes, the present production method employs sterilization and filling processes, where appropriate. These processes may be performed by known methods, and examples thereof include plate-type sterilization and tubular-type sterilization.

<Embodiment 1-2>

Figure 2:
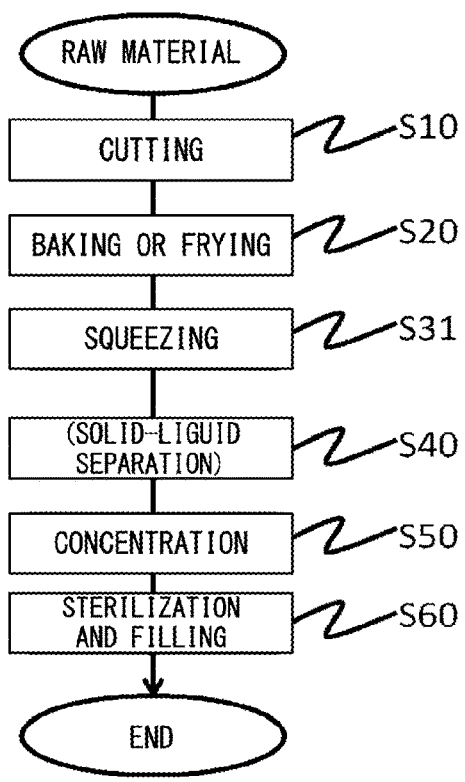
FIG. 2 is a flow chart of a method for producing a cruciferous vegetable seasoning according to an embodiment 1-2.

FIG. 2 is a diagram showing the flow of a production method according to the embodiment 1-2. The production method of the embodiment 1-2 includes cutting (S10), baking or frying (S20), squeezing (S31), solid-liquid separation (S40), concentration (S50), and sterilization and filling (S60). In the present embodiment, the odor-reducing heat treatment and the odor-imparting heat treatment are simultaneously performed at least by baking or frying (S20). Further, the fractionation of components containing an umami component and an odor component is performed at least by squeezing (S31). Only the features of the production method according to the embodiment 1-2 will be described below. Other descriptions are the same as the descriptions in the above-mentioned embodiment 1-1. The above-described embodiment 1-2 is characterized in that a seasoning having a relatively high viscosity and also having a high degree Brix can be produced.

<Squeezing (S31)>

Juice and residues (lees) are obtained by squeezing cut vegetables. That is, the process of squeezing vegetables may be performed by a known method, and examples thereof include a squeezing method, a centrifugal separation method, and the like. Examples of the squeezing apparatus include an extruder, a filter press, a decanter, and a Guinard centrifuge.

<Embodiment 1-3>

Figure 3:
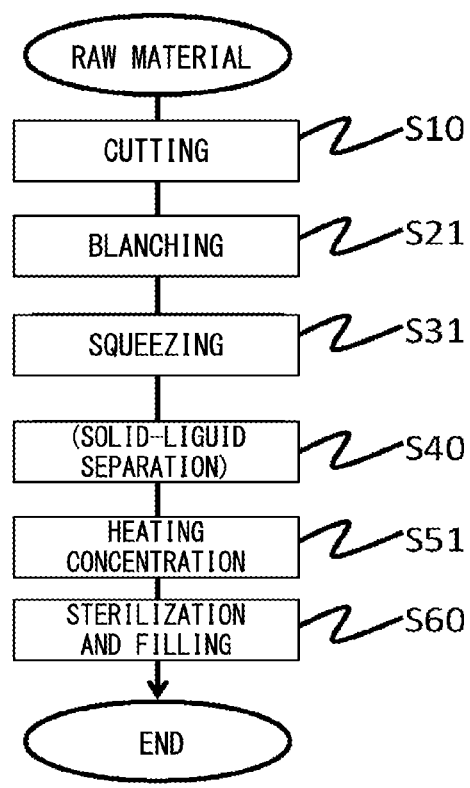
FIG. 3 is a flow chart of a method for producing a cruciferous vegetable seasoning according to an embodiment 1-3.

FIG. 3 is a diagram showing the flow of a production method according to the embodiment 1-3. The production method of the embodiment 1-3 includes cutting (S10), blanching (S21), squeezing (S31), solid-liquid separation (S40), heating concentration (S51), and sterilization and filling (S60). In the present embodiment, the odor-reducing heat treatment is performed at least by blanching (S10). In addition, the odor-imparting heat treatment is performed at least by heating concentration (S51). Furthermore, the fractionation of components containing an umami component and an odor component is performed at least by squeezing (S31). Only the features of the production method according to the embodiment 1-3 will be described below. Other descriptions are the same as the descriptions in the above-mentioned embodiments 1-1 and 1-2. The above-described embodiment 1-3 is characterized in that by including the blanching step, it is possible to produce a seasoning in which components related to acrid taste and astringent taste, such as nitric acid and oxalic acid, are reduced.

<Blanching (S21)>

The purpose of blanching the cut vegetables is to inactivate enzymes. Another purpose is the removal of scum. The method for blanching the cut vegetables is not particularly limited, and specific examples include steam blanching and warm water blanching. The temperature for blanching the cut vegetables is preferably from 50 to 100° C. The blanching time is preferably from 10 minutes to 2 hours.

The expression "temperature for blanching" as used herein means the temperature of steam or warm water.

The contents of Japanese Patent No. 3771919 are incorporated by the present specification for a specific description of blanching.

<Heating Concentration (S51)>

The purpose of heating concentration the liquid of vegetables obtained by squeezing or solid-liquid separation is to improve the handling of the material. By concentrating the material, the volume can be reduced, and the storage cost can be reduced. Another purpose is to enhance the richness. By heating and concentrating the liquid of vegetables obtained by squeezing or solid-liquid separation, a heated odor is provided and the richness becomes strong. In this case, the heating temperature in the heating concentration process is preferably from 45° C. to 100° C.

The heating concentration process is not particularly limited, but it is preferable to concentrate the liquid of vegetables obtained by squeezing or solid-liquid separation, for example, by 2- to 20-fold.

<Koku (Richness)>

The term "koku (richness)" in the present invention is one of sensory characteristics. The main element for judging richness is the persistence of flavors, and more preferably, the complexity of flavors is also considered.

In the present specification, the term "flavor" means smell and taste.

In the present specification, the expression "persistence of flavor" means the property of keeping the flavor.

In the present specification, the expression "complexity of flavor" means a state in which many flavors are felt in a sensory test, but a specific flavor does not stand out and the flavors cannot be clearly separated for classification.

<Grassy Smell>

In the present specification, the term "grassy smell" means a grassy smell possessed by cruciferous vegetables.

It should be noted that examples of components contributing to the grassy smell include 2-hexenal, 1-octene-3-one, dimethyl trisulfide and butyl isothiocyanate.

<Sugar Content (Degrees Brix)>

Although the Brix value is not particularly limited in the vegetable seasoning containing a cruciferous vegetable according to the present embodiment, it is preferably 1.0 or more and 60.0 or less. The method for measuring degrees Brix may be a known method. For example, it can be measured with an optical refractometer (NAR-3T manufactured by ATAGO Co., Ltd.) by setting the product temperature at the time of measurement to 20° C.

It should be noted that in the present specification, the expression "Brix conversion (adjustment)" means adjustment to a desired Brix value by diluting the sample with water.

<pH>

The pH of the vegetable seasoning containing a cruciferous vegetable according to the present embodiment (product temperature at the time of measurement: 20° C.) is not particularly limited, but is preferably from 4.0 to 7.0. When the pH becomes too low and the sourness becomes strong, the sourness is emphasized and it becomes difficult to feel the richness. In addition, when the pH is too high, intensive sterilization is required from the viewpoint of hygiene control, which is also not preferable from the viewpoint of adverse effects on the flavors and the like. The pH is more preferably from 5.0 to 7.0.

<Amount of Centrifugal Precipitation>

The amount of centrifugal precipitation refers to the amount of precipitation when centrifuging a sample under certain conditions which is represented as a volume ratio. The measurement method employed in the present embodiment is as follows. That is, 10 ml of a vegetable seasoning containing a cruciferous vegetable is charged into a 10 ml precipitation tube (glass centrifuge test tube with a scale), and after centrifugation for 10 minutes at 3,000 rpm (1,600× g), the volume of the precipitate is measured at 20° C. Although the amount of centrifugal precipitation is not particularly limited, the amount of centrifugal precipitation when converted (adjusted) to a Brix degree of 2.9 is preferably 0% or more and less than 30% with respect to the vegetable seasoning as a whole. The amount of centrifugation at 2.9 degrees Brix is more preferably 0% or more and less than 5%. The amount of centrifugal precipitation when converted (adjusted) to a Brix degree of 2.9 is still more preferably 0% or more and less than 1% with respect to the vegetable seasoning as a whole. By reducing the amount of centrifugal precipitation, the viscosity can be reduced and application to various products becomes easy. The method for reducing the amount of centrifugal precipitation may be a known method, and specific examples thereof include removal of pulp content by a sieve, removal of pulp by centrifugation, and the like.

<Percent Cumulative Particle Size>

The term "particle size" refers to a value obtained by measuring the major axes of particles. Here, the expression "a % cumulative particle size" refers to a particle size at which the cumulative frequency reaches a % when the cumulative frequency is determined by assuming the total volume of the particle population being 100% in the particle size distribution obtained by the measurement. That is, the 50% cumulative particle size (sometimes abbreviated as D50) refers to the particle size at which the cumulative frequency is 50%. Further, the 90% cumulative diameter (sometimes abbreviated as D90) refers to the particle diameter at which the cumulative frequency is 90%. The means for measuring the particle size is a laser diffraction/scattering type particle size distribution measuring device.

Although the particle diameter of the vegetable seasoning containing a cruciferous vegetable in the present invention is not particularly limited, D50 is preferably 0 μm or more and 250 μm or less. In addition, D90 is preferably 0 μm or more and 700 μm or less. D50 is more preferably 0 μm or more and 100 μm or less. In addition, D90 is more preferably 0 μm or more and 400 μm or less. By reducing the particle size, the properties become smooth and application to various products becomes easy. The method for reducing the particle size may be a known method, and specific examples thereof include micronization with a fine processor, removal of pulp content by a sieve, and removal of pulp by centrifugation.

In one aspect, the method for producing a cruciferous vegetable seasoning according to the present invention is a production method including:

cutting a cruciferous vegetable and, if desired, a vegetable other than the aforementioned cruciferous vegetable;

subjecting the aforementioned cut vegetables to an odor-reducing heat treatment and an odor-imparting heat treatment at the same time by baking or frying;

fractionating a liquid containing at least an umami component and an odor component by subjecting the vegetable which has been subjected to the aforementioned odor-reducing heat treatment and the odor-imparting heat treatment to infusion in water, followed by solid-liquid separation;

concentrating a liquid obtained by the fractionation; and if desired, sterilizing the concentrated liquid and filling into a container.

Furthermore, the temperature of the aforementioned odor-reducing heat treatment and the odor-imparting heat treatment may be from 45° C. to 200° C., and preferably from 75° C. to 180° C.;

the time for the aforementioned odor-reducing heat treatment and the odor-imparting heat treatment may be preferably from 10 to 120 minutes; and the temperature of the fractionation may be from 85 to 98° C.

In one aspect, the method for producing a cruciferous vegetable seasoning according to the present invention is a production method including:

cutting a cruciferous vegetable and, if desired, a vegetable other than the aforementioned cruciferous vegetable;

subjecting the aforementioned cut vegetables to an odor-reducing heat treatment and an odor-imparting heat treatment at the same time by baking or frying;

fractionating a liquid containing an umami component and an odor component from the vegetable which has been subjected to the aforementioned odor-reducing heat treatment and the odor-imparting heat treatment by squeezing the vegetable which has been subjected to the aforementioned odor-reducing heat treatment and the odor-imparting heat treatment, followed by solid-liquid separation;

concentrating a liquid obtained by the fractionation; and if desired, sterilizing the concentrated liquid and filling into a container.

Furthermore, the temperature of the aforementioned odor-reducing heat treatment and the odor-imparting heat treatment may be from 45° C. to 200° C., and preferably from 75° C. to 180° C.; and the time for the aforementioned odor-reducing heat treatment and the odor-imparting heat treatment may be preferably from 10 to 120 minutes.

In one aspect, the method for producing a cruciferous vegetable seasoning according to the present invention is a production method including:

cutting a cruciferous vegetable and, if desired, a vegetable other than the aforementioned cruciferous vegetable;

subjecting the aforementioned cut vegetables to an odor-reducing heat treatment by blanching;

fractionating a liquid by squeezing the vegetable which has been subjected to the aforementioned odor-reducing heat treatment, followed by solid-liquid separation;

subjecting a liquid obtained by the fractionation to an odor-imparting heat treatment by heating concentration; and if desired, sterilizing the liquid which has been subjected to the aforementioned odor-imparting heat treatment and filling into a container.

Furthermore, the temperature of the aforementioned odor-reducing heat treatment may be from 50° C. to 100° C.;

the time for the aforementioned odor-reducing heat treatment may be from 10 minutes to 2 hours; and the temperature of the aforementioned odor-imparting heat treatment may be from 45 to 100° C.

[Second Aspect]

<Food or Drink>

The food or drink in the second aspect of the present invention is a drinkable or edible product, and examples thereof include beverages, foods, seasonings, raw materials for foods and drinks, squeezed liquids, extracts (extracted products), powders, portions and supplements.

<Cruciferous Vegetable>

The cruciferous vegetables in the second aspect of the present invention are the same vegetables as the cruciferous vegetables described in the aforementioned first aspect. The raw material of the food or drink in the second aspect may be any one or more of these vegetables. Moreover, the above raw material may be all or part of a portion (flower, leaf or stem) of these vegetables.

<Cruciferous Vegetable-Containing Food or Drink>

The term "cruciferous vegetable-containing food or drink" in the second aspect means a food or drink whose raw material is at least derived from a cruciferous vegetable, and the above food or drink may further contain other raw materials. Examples of raw materials derived from cruciferous vegetables include cruciferous vegetables and cut products, crushed materials, squeezed liquids, strained lees and extracted products of cruciferous vegetables, or dried products thereof. The other raw materials contained are preferably vegetables and are not particularly limited as long as they are vegetables commonly used in the art, and examples thereof include carrot, onion, turnip, Japanese radish, celery, spinach, bell pepper, asparagus, young barley leaf, garland chrysanthemum, Chinese mustard, butterhead lettuce, komatsuna, *Angelica keiskei*, sweet potato, potato, tomato, mulukhiya, paprika, parsley, celery, Japanese honeywort, lettuce, radish, *Perilla frutescens* var. crispa, eggplant, kidney bean, pumpkin, burdock, Welsh onion, ginger, garlic, Chinese chives, corn, snap peas, okra, turnip, cucumber, cucurbitaceous plants, zucchini, sponge gourd and sprout. When the raw materials of the above-mentioned food or drink are preferably, in addition to cruciferous vegetables, carrots, onions and celery, the overall taste balance is improved.

<Odor Component>

The odor component contributing to the effects of the present invention is at least one component selected from the component (A) (phenylacetaldehyde), the component (B) (2-hexenal), the component (C) (1-octen-3-one), the component (D) (dimethyl trisulfide), and the component (E) (butyl isothiocyanate).

The odor component may be derived from the raw material or may be incorporated by addition, but a component derived from the raw material is preferable from the viewpoint of avoiding additives.

<Component (A) (Phenylacetaldehyde)>

The component (A) (phenylacetaldehyde) generally has a characteristic honey-like smell. The inventors of the present invention have found that the above component increases by undergoing a heating step. It is presumed that phenylacetaldehyde is generated by heating and breaking down phenylalanine, which is a kind of amino acid. In terms of contributing to the effects of the present invention, the content of the component (A) (phenylacetaldehyde) when the food or drink has a Brix degree of 5.0 is 89.0 ppb or more, preferably 89.0 ppb or more and 116.0 ppb or less, more preferably 89.0 ppb or more and 107.0 ppb or less, and particularly preferably 98.0 ppb or more and 107 ppb or less, with respect to the total mass of the food or drink.

<Component (B) (2-hexenal)>

The component (B) (2-hexenal) generally has a characteristic fresh or grassy smell of grass and leaves, and is contained in vegetables and fruits. In terms of contributing to the effects of the present invention, the content of the component (B) (2-hexenal) when the cruciferous vegetable-containing food or drink has a Brix degree of 5.0 is preferably 0.48 ppb or less, more preferably 0.20 ppb or more and 0.48 ppb or less, and particularly preferably 0.20 ppb or more and 0.40 ppb or less, with respect to the total mass (ppb) of the food or drink <Component (C) (1-octen-3-one)>

The component (C) (1-octen-3-one) generally has a characteristic mushroom-like smell. In terms of contributing to the effects of the present invention, the content of the component (C) (1-octen-3-one) when the food or drink has a Brix degree of 5.0 is preferably 3.87 ppb or less, more preferably 1.38 ppb or more and 3.87 ppb or less, and still more preferably 1.38 ppb or more and 2.80 ppb or less, with respect to the total mass of the food or drink.

<Component (D) (Dimethyl Trisulfide)>

The component (D) (dimethyl trisulfide) generally has a characteristic fresh onion-like smell, and is contained in cruciferous vegetables such as cabbage, broccoli and cauliflower. In terms of contributing to the effects of the present invention, the content of the component (D) (dimethyl trisulfide) when the food or drink has a Brix degree of 5.0 is preferably 25.83 ppb or less, more preferably 6.50 ppb or more and 25.83 ppb or less, and still more preferably 6.50 ppb or more and 15.00 ppb or less, with respect to the total mass of the food or drink.

<Component (E) (Butyl Isothiocyanate)>

The component (E) (butyl isothiocyanate) generally has a pungent smell, and is contained in cruciferous vegetables and the like. In terms of contributing to the effects of the present invention, the content of the component (E) (butyl isothiocyanate) when the food or drink has a Brix degree of 5.0 is preferably 0 ppb or more and 0.04 ppb or less, and more preferably 0 ppb, with respect to the total mass of the food or drink.

<Content Ratio of Odor Components>

In the present invention, a relatively high content of the component (A) (phenylacetaldehyde) contributes to the effect of the present invention (that is, enhancement of richness). On the other hand, problems of the present invention cannot be solved when the component (B) (2-hexenal), the component (C) (1-octen-3-one), the component (D) (dimethyl trisulfide) or the component (E) (butyl isothiocyanate) is contained in a relatively large amount. Therefore, the ratio of the content of the component (A) to the content of the component selected from the components (B) to (E) is an important factor for solving the problems of the present invention.

In terms of solving the problems of the present invention, the ratio of the contents (ppb) of the odor components (A) to (D) preferably satisfies the conditions of $0 \le (B)/(A) \le 0.00539$, $0 \le (C)/(A) \le 0.0435$ and $0 \le (D)/(A) \le 0.290$.

More preferably, the ratio of the contents (ppb) of the odor components (A) to (E) satisfies the conditions of $0.00187 \le (B)/(A) \le 0.00539$, $0.0129 \le (C)/(A) \le 0.0435$ and $0.0607 \le (D)/(A) \le 0.290$, and it is still more preferable that the above conditions are satisfied and the condition of $0 \le (E)/(A) \le 0.00045$ is satisfied.

<Koku (Richness)>

In the second aspect, the term "koku (richness)" is as described in the "koku (richness)" in the aforementioned first aspect.

Although the "persistence" and "complexity" of the flavors in the present invention are evaluated in a human sensory evaluation test, it is preferable to conduct training inside the panel so as not to cause a difference in criteria among the evaluators. More specifically, the following steps are preferably taken. First, depending on the subjectivity of the panel, a sample having a flavor persistence and complexity (positive control) and a sample without them (negative control) are prepared, and a language development process for each sensory characteristic is conducted among the evaluators. Next, using the specific expressions that appeared in the language development process, discussions are conducted among the evaluators to reach a consensus on the definition of the terms "persistence" and "complexity". Then, with regard to the "persistence" and "complexity", evaluation criteria for the presence or absence and strength are set, and various test samples are evaluated. In order to accurately describe sensory characteristics, it is preferable to use a flavor profile method, in which trained panelists freely discuss the sensory characteristics until reaching a consensus.

<Grassy Smell>

The term "grassy smell" in the second embodiment refers to a grassy smell which is felt from 2-hexenal, dimethyl trisulfide and 1-octene-3-one possessed by cruciferous vegetables, and more specifically, a grassy smell which is further felt from butyl isothiocyanate, in addition to the above-mentioned odor components.

<Sugar Content (Degrees Brix)>

Although the Brix value is not particularly limited in the food or drink in the second aspect, it is preferably 1.0 or more and 60.0 or less. The Brix degrees can be measured by the same method as in the aforementioned first aspect.

<Method for Producing Cruciferous Vegetable-containing Food or Drink>

The cruciferous vegetable-containing food or drink according to the second aspect is not particularly limited as long as it is a production method in which the contents of the components (A) to (E) in the food or drink to be obtained and the content ratio of the components (A) to (E) satisfy the numerical ranges of the present invention. For example, it can be suitably produced by appropriately selecting heat treatment conditions, fractionation conditions, concentration conditions and the like in a known production process. A specific odor component may be added for production.

In one aspect, a cruciferous vegetable-containing food or drink according to the second aspect of the present invention is a food or drink containing cut products, crushed products, squeezed liquid, strained lees, and extracted products of the aforementioned cruciferous vegetable, or dried products thereof, or the like, wherein the raw material of the aforementioned food and drink is at least a cruciferous vegetable, and, if desired, a vegetable other than the aforementioned cruciferous vegetable, and preferably at least broccoli, an onion, celery and a carrot;

the aforementioned food or drink contains phenylacetaldehyde (component (A)), 2-hexenal (component (B)), 1-octen-3-one (component (C)), and dimethyl trisulfide (component (D));

when a Brix degree of the aforementioned food or drink is converted to 5.0, with respect to the total mass of the aforementioned food or drink, the content of the component (A) is 89.0 ppb or more, preferably 89.0 ppb or more and 116.0 ppb or less, more preferably 89.0 ppb or more and 107.0 ppb or less, and particularly preferably 98.0 ppb or more and 107 ppb or less, the content of the component (B) is 0.48 ppb or less, more preferably 0.20 ppb or more and 0.48 ppb or less, and particularly preferably 0.20 ppb or more and 0.40 ppb or less, the content of the component (C) is 3.87 ppb or less, more preferably 1.38 ppb or more and 3.87 ppb or less, and still more preferably 1.38 ppb or more and 2.80 ppb or less, and the content of the component (D) is 25.83 ppb or less, more preferably 6.50 ppb or more and 25.83 ppb or less, and still more preferably 6.50 ppb or more and 15.00 ppb or less;

content ratios of the component (A) to the components (B) to (D) satisfy the following relationships:

$0<(B)/(A)\leq0.00539$, and preferably $0.00187\leq(B)/(A)\leq0.00539$, $0<(C)/(A)\leq0.0435$, preferably $0.0129\leq(C)/(A)\leq0.0435$, and $0<(D)/(A)\leq0.290$, and preferably $0.0607\leq(D)/(A)\leq0.290$.

The aforementioned cruciferous vegetable-containing food or drink may further contain butyl isothiocyanate (component (E)), the content of the component (E) may be more than 0 ppb and 0.04 ppb or less with respect to the total mass of the aforementioned food or drink when a Brix degree of the food and drink is converted to 5.0, and the content ratio of the component (A) to the component (E) may be $0<(E)/(A)\leq0.00045$.

EXAMPLES

[Production of Vegetable Seasonings and Evaluation of their Richness]

Comparative Example 1A

Broccoli was shredded to about 5 mm and extracted at 95° C. for 1 h with water of twice the amount of the shredded broccoli. The resulting extract was separated into a solid fraction and a liquid fraction by a sieve of 0.5 mm mesh, and the liquid fraction was used as a sample.

Example 1A

Broccoli was shredded to about 5 mm and roasted at 140° C. Then, the resultant was extracted at 95° C. for 1 h with water of twice the amount of the shredded broccoli. The resulting extract was separated into a solid fraction and a liquid fraction by a sieve of 0.5 mm mesh, and the liquid fraction was used as a sample.

Comparative Example 2A

Broccoli was shredded to about 5 mm, squeezed with a juice extractor, and then subjected to hot pack filling.

Example 2A

Broccoli was shredded to about 5 mm and roasted at 140° C. Then, the resultant was squeezed with a juice extractor, and then subjected to hot pack filling.

Comparative Example 3A

A cabbage was cut into about 2 cm pieces and extracted at 95° C. for 1 h with water of twice the amount of the cut cabbage. The resulting extract was separated into a solid fraction and a liquid fraction by a sieve of 0.5 mm mesh, and the liquid fraction was used as a sample.

Example 3A

A cabbage was cut into about 2 cm pieces and roasted at 140° C., and then extracted at 95° C. for 1 h with water of twice the amount of the cut cabbage. The resulting extract was separated into a solid fraction and a liquid fraction by a sieve of 0.5 mm mesh, and the liquid fraction was used as a sample.

Comparative Example 4A

Broccoli, onions, celery and carrots were cut into about 2 cm pieces and extracted at 95° C. for 1 h with hot water of twice the amount of the cut vegetables. After removal of solid fractions, the extract was concentrated in vacuo to a Brix degree of 20. The concentrated sample was diluted with water to a Brix degree of 5.0.

Example 4A

Broccoli, onions, celery and carrots were cut into about 2 cm pieces, and the cut vegetables were roasted at 140° C. and then extracted at 95° C. for 1 h with hot water of twice the amount of the cut vegetables. After removal of solid fractions, the extract was concentrated in vacuo to a Brix degree of 20. The concentrated sample was diluted with water to a Brix degree of 5.0.

<Measurement of Sugar Content (Degrees Brix)>

A sugar content (Brix) measuring device employed in this measurement is a refractometer (NAR-3T manufactured by Atago Co., Ltd.). The product temperature at the time of measurement was 20° C.

<Measurement of pH>

A pH measuring device employed in this measurement is a pH meter (pH METER F-52 manufactured by HORIBA, Ltd.). The product temperature at the time of measurement was 20° C.

<Amount of Centrifugal Precipitation>

10 ml of a vegetable seasoning (Brix: 2.9°) containing a cruciferous vegetable was charged into a 10 ml precipitation tube (glass centrifuge test tube with a scale), and after centrifugation for 10 minutes at 3,000 rpm (1,600×g), the volume of the precipitate was measured.

<Measurement of Particle Size>

Using a laser diffraction/scattering type particle size distribution measuring device ("LA-960" manufactured by HORIBA, Ltd.), a particle size (D50) and a particle size (D90) at which the cumulative frequency in terms of volume became 50% and 90%, respectively, were measured. The refractive index, the circulation speed and the stirring speed were set to "1.60-0.00i", "3" and "1", respectively.

<Sensory Evaluation>

Sensory evaluators (panelists) having a keen sense of evaluating flavors were selected. (Comparative Example 1A and Example 1A are collectively referred to as Category 1A, and the same applies to Categories 2A to 4A hereinafter.) The sensory evaluation was carried out by adjusting the Brix value to 2.9 with distilled water for Category 1A and Category 2A, and adjusting the Brix value to 1.9 for Category 3. With regard to Category 1A to Category 4A, the evaluation of identifiability in Comparative Examples and Examples was performed by 9 panelists using a three-point identification method.

Furthermore, the comparative example and the example were compared for each category, and evaluation of "enhancement of richness and suppression of grassy smell" with regard to flavors was carried out by 11 panelists using a two-point comparison method. The term "richness" was defined by the "persistence" and "complexity" of flavors, and the term "complexity" was defined as follows.

That is, the "complexity" is felt in a state in which many flavors are felt, but a specific flavor does not stand out and the flavors cannot be clearly separated for classification.

<Sensory Evaluation Criteria>

The identifiability was judged at a significance level (P value) of 5% using the binomial distribution probability (BINOMDIST function) of an individual term, based on the evaluation of each panelist. In the sensory evaluation by the two-point comparison method, the panelists evaluated whether the richness was enhanced and the grassy smell was suppressed in the examples using the comparative examples within the same category as controls.

The presence or absence of "enhancement of richness and suppression of grassy smell" was evaluated (the case where the "enhancement of richness and suppression of grassy smell" were confirmed was evaluated as "Y", and the case where the "enhancement of richness and suppression of grassy smell" were not confirmed was evaluated as "X") at a significance level (P value) of 5% using the binomial distribution probability (BINOMDIST function) of an individual term, based on the evaluation of each panelist.

<Results>

In each of the Categories 1A to 4A, the results showed that the comparative example and the example were significantly different and were distinguishable. Further, with regard to each of the Categories 1A to 4A, the results showed that the richness was enhanced and the grassy smell was suppressed in the example as compared with the comparative example. "Bx" in the tables denotes the Brix degree.

TABLE 1A

| | Category 1A | | Category 2A | | Category 3A | | Category 4A | |
|---|---|---|---|---|---|---|---|---|
| | Comp. Ex. 1A | Ex. 1A | Comp. Ex. 2A | Ex. 2A | Comp. Ex. 3A | Ex. 3A | Comp. Ex. 4A | Ex. 4A |
| Bx | 3.7 | 3.1 | 7.5 | 5.8 | 1.9 | 2.5 | 5 | 5 |
| pH | 5.77 | 5.63 | 6.57 | 6.75 | 6.1 | 5.64 | Unmeasured | Unmeasured |
| Particle size (μm) (D50) | 155 | 83 | 141 | 230 | 160 | 123 | Unmeasured | Unmeasured |
| Particle size (μm) (D90) | 418 | 615 | 403 | 613 | 356 | 295 | Unmeasured | Unmeasured |
| Amount of centrifugal precipitation (%) (at 2.9° Bx) | Less than 1 | Less than 1 | 13 | 29 | Unmeasured | Unmeasured | Unmeasured | Unmeasured |
| Sensory evaluation (significant difference with comparative example within the same category) | | | | | | | | |
| Enhancement of richness and suppression of grassy smell | X | Y | X | Y | X | Y | X | Y |

<Summary>

From the above test results, it was possible to produce an extract (extracted liquid) in which the richness was enhanced by subjecting a cruciferous vegetable that has undergone a baking or frying process to infusion in water and solid-liquid separation. In addition, it was possible to produce a squeezed liquid with enhanced richness by squeezing a cruciferous vegetable that has undergone a baking or frying process. Furthermore, it was possible to confirm the effects of the present invention even when using other vegetables concurrently in addition to cruciferous vegetables. By summarizing the above results, it was found that at least an odor-reducing heat treatment and an odor-imparting heat treatment constituted the method for producing a cruciferous vegetable seasoning according to the present invention. That is, it was found that the method for producing a cruciferous vegetable seasoning according to the present invention can produce a cruciferous vegetable seasoning with enhanced richness by at least including an odor-reducing heat treatment and an odor-imparting heat treatment.

The odor-imparting heating is performed after or at the same time as the aforementioned odor-reducing heat treatment.

[Test 1B: Production of Cruciferous Vegetable Seasonings and Evaluation of their Richness]

Comparative Example 1B

Broccoli, onions, celery and carrots were cut into about 5 mm pieces and extracted at 90° C. or higher with hot water of twice the amount of the cut vegetables. After removal of solid fractions, the extract was concentrated in vacuo to a Brix degree of 20. The concentrated sample was diluted with water to a Brix degree of 5.0 and used as a sample of Comparative Example 1B.

Example 1B

Broccoli, onions, celery and carrots were cut into about 5 mm pieces, and the cut vegetables were roasted, and then extracted at 90° C. to 100° C. with hot water of twice the amount of the cut vegetables. After removal of solid fractions, the extract was concentrated in vacuo to a Brix degree of 20. The concentrated sample was diluted with water to a Brix degree of 5.0 and used as a sample of Example 1B.

Comparative Example 2B

Broccoli was cut into about 5 mm pieces and extracted at 90° C. to 100° C. with hot water of twice the amount of the cut vegetable. After removal of solid fractions, the extract was concentrated in vacuo to a Brix degree of 20. The concentrated sample was diluted with water to a Brix degree of 5.0 and used as a sample of Comparative Example 2B.

Example 2B

Broccoli was cut into about 5 mm pieces, and the cut vegetable was roasted, and then extracted at 90° C. to 100° C. with hot water of twice the amount of the cut vegetable. After removal of solid fractions, the extract was concentrated in vacuo to a Brix degree of 20. The concentrated sample was diluted with water to a Brix degree of 5.0 and used as a sample of Example 2B.

<Measurement of Sugar Content (Degrees Brix)>

A sugar content (Brix) measuring device employed in this measurement is a refractometer (NAR-3T manufactured by Atago Co., Ltd.). The product temperature at the time of measurement was 20° C.

<Volatile Component Analysis>

By comparing the concentrations of volatile components contained in the produced samples of Comparative Example 1B and Example 1B, and comparing the concentrations of volatile components contained in the samples of Comparative Example 2B and Example 2B, an odor component contributing to the difference in the flavor was identified. This measurement is performed using a 7890 GC/5975 MSD system manufactured by Agilent Technologies, Inc. attached with an autosampler (MPS2), a dynamic headspace module (DHS), a thermal desorption unit (TDU) and a programmable temperature vaporizing inlet (CIS4) manufactured by GERSTEL GmbH & Co. KG The sample of 0.5 to 2 g was weighed into a dedicated vial and diluted with ultrapure water so as to achieve a total amount of 5 g. 5 µl of a 10 ppm solution of 1,2-dichlorobenzene was added as an internal standard.

Odor components were collected in a dedicated Tenax TA tube by the DHS method, and thermal desorption analysis by the TDU-1D-GC/MS system was performed.

GC/MS conditions

Column: Agilent DB-WAX (60 m×0.25 mm×0.5 µm)

Oven temperature: 40° C. (3 min)→10° C./min→240° C. (27 min)

Carrier gas: 3.1 ml/min (helium)

MS mode: SCAN (mass range: 29 to 450)

When the contents of volatile components are compared between Comparative Example 1B and Example 1B and between Comparative Example 2B and Example 2B at a Brix degree of 5.0, components which is contained in larger amounts in Example 1B than in Comparative Example 1B and in larger amounts in Example 2B than in Comparative Example 2B were identified. In addition, components which is contained in smaller amounts in Example 1B than in Comparative Example 1B and in smaller amounts in Example 2B than in Comparative Example 2B were identified. Furthermore, when components whose smells are known to be felt by humans in general knowledge and components which are contained in an amount to a degree so as to affect human sensory functions are specified among them, 5 components consisting of the component (A) (phenylacetaldehyde), the component (B) (2-hexenal), the component (C) (1-octen-3-one), the component (D) (dimethyl trisulfide) and the component (E) (butyl isothiocyanate) were identified. The concentrations of the respective components in Comparative Example 1B and Example 1B are shown in Table 1B.

<Soluble Component Analysis in Comparative Example 1B and Example 1B>

Amino acids, nucleic acids, organic acids, and sugars were analyzed for Comparative Example 1B and Example 1B. As a result, the contents were comparable in Comparative Example 1B and Example 1B. Among the measured components, the components contained in concentrations so as to affect the flavor are selected, and the concentrations of the respective components at a Brix degree of 5.0 are shown in Table 2B.

<Measurement of Amino Acid Concentration>

A measurement method of the amino acid concentration employed in this measurement is an HPLC method. More specifically, an amino acid measuring apparatus employed in this measurement is a high-speed amino acid analyzer L-8000 series (manufactured by Hitachi, Ltd.). The measurement conditions are as follows: ammonia filter column:

2650L (inner diameter: 4.6 mm×60 mm, manufactured by Hitachi, Ltd.), analytical column: #2622 (inner diameter: 4.6 mm×60 mm, manufactured by Hitachi, Ltd.), guard column: #2619 [inner diameter: 4.6 mm×60 mm, manufactured by Hitachi, Ltd.], mobile phase: lithium citrate buffer solution, reaction solution: ninhydrin solution, detection wavelength: VIS 570 nm.

<Measurement of Bucleic Acid Concentration>

A measuring method of the nucleic acid concentration employed in this measurement is a high performance liquid chromatography (hereinafter sometimes abbreviated as HPLC) method. The specific measurement conditions are as follows.

Column: Develosil RPAQUEOUS AR-5, 4.6 mm×250 mm [manufactured by Nomura Chemical Co., Ltd.]
Eluent: A; sodium phosphate buffer (pH 2.5), B: 90% acetonitrile
Gradient conditions: proportion of solution A: 100% (0 to 5 minutes)—92.5% (25 minutes)—80% (25.1 to 28 minutes)—100% (28.1 to 32 minutes)
Flow rate: 1.0 ml/min
Detection wavelength: 254 nm
Column temperature: 40° C.

<Measurement of Organic Acid Concentration>

A measurement method of the nucleic acid concentration employed in this measurement is an HPLC method. The specific measurement conditions are as follows.

Column: C610H-S [manufactured by Hitachi, Ltd.]
Eluent: 3 mM perchloric acid
Reaction solution: 0.1 mM BTB, 15 mM sodium hydrogen phosphate, 2 mM sodium hydroxide
Gradient conditions: proportion of solution A: 100% (0 to 5 minutes)—92.5% (25 minutes)—80% (25.1 to 28 minutes)—100% (28.1 to 32 minutes)
Flow rate: eluent 0.5 ml/min, reaction solution 0.5 ml/min
Detection wavelength: 440 nm
Column temperature: 50° C.

<Measurement of Sugar Concentration>

A measurement method of the nucleic acid concentration employed in this measurement is an HPLC method. The specific measurement conditions are as follows.

Column: Shodex Asahipak NH2P-50 4E
Eluent: acetonitrile/water=75/25
Flow rate: 1.0 ml/min
Detection: differential refractive index detector
Column temperature: 50° C.

TABLE 1B

| | | Concentration when converted to °Brix 5.0 | |
|---|---|---|---|
| | Component name | Comp. Ex. 1B | Ex. 1B |
| Odor component (ppb) | (A): Phenylacetaldehyde | 71.0 | 98.0 |
| | (B): 2-Hexenal | 0.65 | 0.40 |
| | (C): 1-Octen-3-one | 6.10 | 2.75 |
| | (D): Dimethyl trisulfide | 51.50 | 13.0 |
| | (E): Butyl isothiocyanate | 0.125 | 0 |

TABLE 2B

| | | Concentration when converted to °Brix 5.0 | | |
|---|---|---|---|---|
| | Component name | Comp. Ex. 1B | Ex. 1B | Intermediate value |
| Amino acid (mg/100 g) | Aspartic acid | 14.16 | 13.58 | 13.9 |
| | Glutamic acid | 25.88 | 24.21 | 25 |
| | Arginine | 30.79 | 28.15 | 29.5 |
| Organic acid (%) | Citric acid | 0.06 | 0.06 | 0.06 |
| | Malic acid | 0.17 | 0.16 | 0.17 |
| | Pyroglutamic acid | 0.04 | 0.04 | 0.04 |
| Sugar (%) | Sucrose | 0.65 | 0.65 | 0.65 |
| | Fructose | 1.12 | 1.13 | 1.13 |
| | Glucose | 1.25 | 1.26 | 1.26 |
| Nucleic acid (ppm) | Guanylic acid | 49.4 | 57.4 | 53.4 |

<Sensory Evaluation Training>

Seven people having a keen sense of evaluating flavors were selected as sensory evaluators (panelists) to form a panel. As a result of evaluating the persistence and complexity of the flavors with respect to Comparative Example 1B and Example 1B by the panel composed of 7 people, all the panelists felt the difference between Comparative Example 1B and Example 1B and the persistence and complexity of the flavor in Example 1B. Similarly, the results showed that they felt the difference between Comparative Example 2B and Example 2B and the persistence and complexity of the flavor in Example 2B.

With regard to the difference in flavor between Comparative Example 1B and Example 1B, a panel consisting of 7 people conducted a language development process and defined the "persistence" and "complexity" of the flavor using the specific expressions developed during the process. The definitions of the terms "persistence" and "complexity" of flavors were as follows.

"Persistence" is felt: a state in which the grassy smell is absent and a honey-like smell is felt after swallowing.

"Complexity" is felt: a state in which many flavors are felt, but a specific flavor does not stand out and the flavors cannot be clearly separated for classification.

By using the respective standard products of the odor components (A) to (E), it was confirmed, by the orthonasal and retronasal sensory evaluation by the panel, that the flavor characteristics of the "grassy smell" and the flavor characteristics involved in the "persistence" and "complexity" defined by the panel are related to the odor components of the standard products of the components (A) to (E). It was the opinion of the panel that the component (A), in particular, affected the "persistence".

[Test 2B: Identification of Richness Enhancing Range Using Model Solution]

<Sensory Evaluation Using Model Solution>

The base solutions were prepared using standard products of sugars (sucrose, fructose, glucose), organic acids (citric acid, malic acid, pyroglutamic acid) and amino acids (aspartic acid, glutamic acid, arginine), and water. An intermediate value between the measured values of Comparative Example 1B and Example 1B described in Table 2B was used as the content of each component. The standard products of the odor components (A) to (E) were adjusted with respect to the base solution so as to have component contents of Categories 1B to 6B described in Table 3B below. Category 1B was adjusted so as to be equivalent to the component content of Comparative Example 1B, and Category 4B was adjusted so as to be equivalent to the component content of Example 1B. With regard to the categories 1B to 6B, a sensory evaluation was performed by a panel trained by the aforementioned sensory evaluation training.

For the sensory evaluation regarding the "persistence", a 5-grade evaluation described in Table 4B below was performed. As reference samples for the evaluation, the level of "persistence" of the flavor felt in Comparative Example 1B was set to "2", and the level of "persistence" of the flavor felt in Example 1B was set to "4".

For the sensory evaluation regarding the "complexity", an absolute evaluation was performed by selecting either "complex" or "not complex".

It was the opinion of the panel that the grassy smell was felt with regard to categories 1B and 2B, although no grassy smell was felt with regard to categories 3B to 6B, and the sensory evaluation regarding the "grassy smell" was also performed for categories 1B and 2B. For the sensory evaluation regarding the "grassy smell", a 5-grade evaluation described in Table 4B below was performed. As reference samples for the evaluation, the level of "grassy smell" of the flavor felt in Comparative Example 1B was set to "4", and the level of "grassy smell" of the flavor felt in Example 1B was set to "2".

TABLE 3B

| | Odor component name | Category 1B Corresponding to Comp. Ex. 1B | Category 2B | Category 3B | Category 4B Corresponding to Ex. 1B | Category 5B | Category 6B |
|---|---|---|---|---|---|---|---|
| Odor component concentration | (A): Phenylacetldehyde | 71.0 | 80.0 | 89.0 | 98.0 | 107.0 | 116.0 |
| | (B): 2-Hexenal | 0.65 | 0.57 | 0.48 | 0.40 | 0.20 | 0 |
| | (C): 1-Octen-3-one | 6.10 | 4.98 | 3.87 | 2.75 | 1.38 | 0 |
| | (D): Dimethyl trisufide | 51.50 | 38.67 | 25.83 | 13.0 | 6.50 | 0 |
| | (E): Butyl isothiocyanate | 0.125 | 0.08 | 0.04 | 0 | 0 | 0 |

TABLE 4B

| Evaluation | Grassy smell | Persistence |
|---|---|---|
| 1 | Not felt | |
| 2 | Hardly felt | |
| 3 | Slightly felt | |
| 4 | Felt | |
| 5 | Strongly felt | |

<Sensory Evaluation Criteria>

For the evaluation regarding the "persistence", based on the score evaluated by each panelist, the cases where the average value was "3 (slightly felt)" or higher and there was a significant difference from the level of persistence felt in Comparative Example 1B "2 (hardly felt)" were evaluated as "Y" (Tukey's test). Other cases were evaluated as "X". Judgments were made at a significance level (P value) of 5%.

The evaluation regarding the presence or absence of "complexity" (a case of "complex" was evaluated as "Y", and a case of "not complex" was evaluated as "X") was judged at a significance level (P value) of 5% using the binomial distribution probability (BINOMDIST function) of an individual term, based on the evaluation of each panelist.

When the significance level for selecting "not complex" was less than 5%, it was judged as "complex" (complexity was present) (a).

For the evaluation regarding the "grassy smell", based on the score evaluated by each panelist, the cases where the average value was "4 (felt)" or higher, or there was no significant difference from the level of grassy smell felt in Comparative Example 1B "4 (felt)" were evaluated as "X".

For the evaluation of richness, those having "persistence" at least was evaluated as "Y" and those further having "complexity" was evaluated as "Z". Those with neither "persistence" nor "complexity" was evaluated as "X".

The sensory evaluation results are shown in Table 5B below.

TABLE 5B

| | Category 1B | Category 2B | Category 3B | Category 4B | Category 5B | Category 6B |
|---|---|---|---|---|---|---|
| | Persistence | | | | | |
| Average value | 1.3 | 1.9 | 3.3 | 4.1 | 4.0 | 5.0 |
| Standard deviation | 0.49 | 0.38 | 0.49 | 0.38 | 0.58 | 0 |
| P value | — | — | <0.05 | <0.05 | <0.05 | <0.05 |
| Evaluation | X | X | Y | Y | Y | Y |
| | Complexity | | | | | |
| Complex (number of panelists) | 0 | 0 | 7 | 7 | 7 | 1 |
| Not complex (number of panelists) | 7 | 7 | 0 | 0 | 0 | 6 |

TABLE 5B-continued

|  | Category 1B | Category 2B | Category 3B | Category 4B | Category 5B | Category 6B |
|---|---|---|---|---|---|---|
| P value | — | — | <0.05 | <0.05 | <0.05 | — |
| Evaluation | X | X | Y | Y | Y | X |
| Grassy smell | | | | | | |
| Average value | 4.9 | 3.6 | — | — | — | — |
| Standard deviation | 0.38 | 0.79 | — | — | — | — |
| P value | — | 0.2 | — | — | — | — |
| Evaluation | X | X | — | — | — | — |
| Richness evaluation | X | X | Z | Z | Z | Y |

<Ratio of Odor Components>

The ratio of each odor component content for Categories 1B to 6B was calculated and shown in Table 6B below.

TABLE 6B

|  | Category 1B | Category 2B | Category 3B | Category 4B | Category 5B | Category 6B |
|---|---|---|---|---|---|---|
| (B)/(A) | 0.00915 | 0.00713 | 0.00539 | 0.00408 | 0.00187 | 0 |
| (C)/(A) | 0.0859 | 0.0623 | 0.0435 | 0.0281 | 0.0129 | 0 |
| (D)/(A) | 0.725 | 0.483 | 0.290 | 0.133 | 0.0607 | 0 |
| (E)/(A) | 0.00176 | 0.00100 | 0.00045 | 0 | 0 | 0 |
| Richness evaluation | X | X | Z | Z | Z | Y |

[Test 3B: Identification of involved Components by Omission Test]

Hereinafter, as shown in Table 7B, based on Category 1B or Category 4B, model solutions in which the odor components were omitted one by one (Categories 4B-b to 4B-d and Category 1B-a), or a model solution in which only one component is added (Category 4B-a) was prepared. A control (1) (Category 1B) was presented as a specimen, and a sensory evaluation of distinguishability from Category 1B-a was performed using a three-point identification method. Similarly, a control (4) (Category 4B) was presented as a specimen, and the distinguishability from each of the Categories 4B-a to 4B-d was evaluated using a three-point identification method. The number of panelists was eight, and when a significance test was conducted with a significance level of 5%, it was found that there was no significant difference between Category 1B-a, or Category 4B-a, and the respective control.

That is, it was thought that butyl isothiocyanate did not substantially contribute to the effects of the present invention.

TABLE 7B

| Category | Category details | Phenylacetaldehyde | 2-Hexenal | 1-Octen-3-one | Dimethyl trisulfide | Butyl isothiocyanate |
|---|---|---|---|---|---|---|
| Control (4) | (Category 4B) | 98.0 | 0.40 | 2.75 | 13.0 | — |
| Category 4B-a | (Category 4B) + (Butyl isothiocyanate) | 98.0 | 0.40 | 2.75 | 13.0 | 0.125 |
| Category 4B-b | (Category 4B) − (2-Hexenal) | 98.0 | — | 2.75 | 13.0 | — |
| Category 4B-c | (Category 4B) − (1-Octen-3-one) | 98.0 | 0.40 | — | 13.0 | — |
| Category 4B-d | (Category 4B) − (Phenylacetaldehyde) | — | 0.40 | 2.75 | 13.0 | — |
| Category 4B-e | (Category 4B) − (Dimethyl trisulfide) | 98.0 | 0.40 | 2.75 | — | — |
| Control (1) | (Category 1B) | 71.0 | 0.65 | 6.10 | 51.5 | 0.125 |
| Category 1B-a | (Category 1B) − (Butyl isothiocyanate) | 71.0 | 0.65 | 6.10 | 51.5 | — |

Hereinafter, as shown in Table 8B, based on Category 2B or Category 3B, a model solution in which the concentration of butyl isothiocyanate was 0 ppb was prepared. A control (2) (Category 2B) was presented as a specimen, and a sensory evaluation of distinguishability from Category 2B-a was performed using a three-point identification method. Similarly, a control (3) (Category 3B) was presented as a specimen, and the distinguishability from Category 3B-a was evaluated using a three-point identification method. The number of panelists was eight, and when a significance test was conducted with a significance level of 5%, it was found that none of them were significantly different from the control.

In addition, when the panel evaluated Category 2B and Category 3B-a, the grassy smell was significantly suppressed in Category 3B-a, resulting in the presence of richness.

TABLE 8B

| Category | Category details | Phenylacetaldehyde | 2-Hexenal | 1-Octen-3-one | Dimethyl trisulfide | Butyl isothiocyanate |
|---|---|---|---|---|---|---|
| Control (2) | (Category 2B) | 80.0 | 0.57 | 4.98 | 38.67 | 0.08 |
| Category 2B-a | (Category 2B) – (Butyl isothiocyanate) | 80.0 | 0.57 | 4.98 | 38.67 | — |
| Control (3) | (Category 3B) | 89.0 | 0.48 | 3.87 | 25.83 | 0.04 |
| Category 3B-a | (Category 3B) – (Butyl isothiocyanate) | 89.0 | 0.48 | 3.87 | 25.83 | — |

From the above results, it was found that butyl isothiocyanate did not contribute to the effects of the present invention within the ranges of Categories 1B to 6B.

[Test 4B: Evaluation of Effect of Grassy Smell on Richness]

The effect on the persistence of the flavor due to an increase of the component involved in the grassy smell was evaluated, where the concentration of phenylacetaldehyde (component (A)) was constant.

The concentration of phenylacetaldehyde in Category 4B was fixed, and the three components (B), (C) and (D) involved in the grassy smell were increased in a stepwise manner to a concentration equivalent to that of Category 1B. More specifically, Categories 1B' to 3B' and Category 4B were prepared so as to have the concentrations shown in Table 9B.

TABLE 9B

| | Unit: ppb | | | |
|---|---|---|---|---|
| Odor component name | Category 1B' | Category 2B' | Category 3B' | Category 4B' |
| Phenylacetaldehyde | 98.0 | 98.0 | 98.0 | 98.0 |
| 2-Hexenal | 0.65 | 0.57 | 0.48 | 0.40 |
| 1-Octen-3-one | 6.10 | 4.98 | 3.87 | 2.75 |
| Dimethyl trisulfide | 51.5 | 38.67 | 25.83 | 13.0 |

When the persistence of the flavors in Category 1B' to Category 3B' and Category 4B was evaluated through the sensory evaluation by five panelists, it was found that there was a significant difference between Category 2B' and Category 3B', with a significance level of 5% (test method: one-way analysis of variance). Further, the results showed that the persistence of the flavor was stronger in Category 3B' and Category 4B, as compared with Category 1B' and Category 2B'.

From the above results, it was found that, even when the concentration of phenylacetaldehyde was constant, the persistence of flavor decreases as the concentrations of the components (B) to (D) increase.

<Summary>

As a result of considering the above test results, it was found that the richness could be felt when the relationships between the content of phenylacetaldehyde (component (A)) and those of 2-hexenal (component (B)), 1-octen-3-one (component (C)) and dimethyl trisulfide (component (D)) were: $0 \leq (B)/(A) \leq 0.00539$, $0 \leq (C)/(A) \leq 0.00435$ and $0 \leq (D)/(A) \leq 0.290$, respectively. Further, it was found that the richness could be felt when the contents of the components (A), (B), (C), (D) and (E) are: 89.0 ppb or more; 0.48 ppb or less; 3.87 ppb or less; 25.83 ppb or less; and 0.04 ppb or less, respectively, when a Brix degree of the aforementioned cruciferous vegetable-containing food or drink was adjusted to 5.0.

INDUSTRIAL APPLICABILITY

The present invention is extremely useful industrially because it can provide a cruciferous vegetable seasoning in which the richness is enhanced, a cruciferous vegetable-containing food or drink in which the richness is enhanced, and a method for enhancing richness in a cruciferous vegetable-containing food or drink.

The invention claimed is:

1. A method for producing a cruciferous vegetable seasoning, the method comprising:
   at least an odor-reducing heat treatment and an odor-imparting heat treatment, wherein
   said odor-reducing heat treatment comprises heating a cruciferous vegetable so as to reduce an odor thereof;
   said odor-imparting heat treatment comprises subjecting a liquid of said cruciferous vegetable to odor-imparting heating, thereby imparting a heated odor thereto;
   said odor-imparting heat treatment is performed after said odor-reducing heat treatment,
   after said odor-reducing heat treatment and said odor-imparting heat treatment, further comprising fractionating a component including at least an umami component and an odor component from said cruciferous vegetable, thus producing said cruciferous vegetable seasoning by the fractionated component,
   wherein the fractionation is performed by solvent extraction or squeezing;
   wherein said odor-reducing heat treatment comprises roasting, wherein the cruciferous vegetable seasoning comprises:
phenylacetaldehyde (component (A)); and at least one component selected from the group consisting of 2-hexenal (component (B)), 1-octen-3-one (component (C)), and dimethyl trisulfide (component (D),
wherein the ratios of component (A) to the components (B) to (D) are:

$0 \leq (B)/(A) \leq 0.00539;$ $0 \leq (C)/(A) \leq 0.0435;$ and $0 \leq (D)/(A) \leq 0.290.$ 2. The method according to claim 1, wherein said odor-reducing heat treatment further comprises inactivating an endogenous enzyme of said cruciferous vegetable by subjecting said cruciferous vegetable to odor-reducing heating.

3. The method according to any one of claim 1, wherein said odor-imparting heat treatment is heating concentration.

4. A method for producing a cruciferous vegetable seasoning, the method comprising:
at least an odor-reducing heat treatment and an odor-imparting heat treatment, wherein
said odor-reducing heat treatment comprises heating a cruciferous vegetable so as to reduce an odor thereof;
said odor-imparting heat treatment comprises subjecting said cruciferous vegetable to odor-imparting heating, thereby imparting a heated odor thereto; and
after said odor-reducing heat treatment and said odor-imparting heat treatment, further comprising fractionating a component including at least an umami component and an odor component from said cruciferous vegetable, thus producing the cruciferous vegetable seasoning by the fractionated component;
wherein said odor-reducing heat treatment and/or said odor-imparting heat treatment comprises roasting,
wherein the cruciferous vegetable seasoning comprises:
phenylacetaldehyde (component (A)); and
at least one component selected from the group consisting of 2-hexenal (component (B)), 1-octen-3-one (component (C)), and dimethyl trisulfide (component (D),
wherein the ratios of component (A) to the components (B) to (D) are:

$0 \leq (B)/(A) \leq 0.00539;$ $0 \leq (C)/(A) \leq 0.0435;$ and $0 \leq (D)/(A) \leq 0.290.$ 5. The method according to claim 4, wherein said odor-reducing heat treatment comprises subjecting said cruciferous vegetable to odor-reducing heating, thereby vaporizing an odor component contained in said cruciferous vegetable.

6. The method according to claim 4, wherein said odor-reducing heat treatment and said odor-imparting heat treatment are both baking.

7. The method according to claim 4, wherein the fractionation is performed by solvent extraction or squeezing.

8. The method according to claim 1, wherein the cruciferous vegetable includes at least broccoli, and wherein the cruciferous vegetable seasoning further contains at least an onion and a carrot as a raw material.

9. The method according to claim 4, wherein the cruciferous vegetable includes at least broccoli, and wherein the cruciferous vegetable seasoning further contains at least an onion and a carrot as a raw material.

* * * * *